3,280,696
VIBRATING GLASS SCREEN
Kourken K. Ketchian, 79 Sherman Ave.,
New York, N.Y.
Filed Feb. 28, 1964, Ser. No. 348,128
4 Claims. (Cl. 88—24)

This invention relates to the art of photographic apparatus for producing half-tone and color films and plates, and more particularly to improvements in the method and means for screening and modifying the half-tone dots formed by transmission of an image through a glass screen surface.

According to the invention either the glass screen or the copy being photographed or both are vibrated in a predetermined manner during the exposure of the copy to the photosensitive film, plate or material.

It is one object of the invention to provide a method and means whereby a cameraman may improve, modify and control highlights, middletones, shadows, and details at will by selectively vibrating the copy or screen through which the copy is photographed.

Other objects are to provide a method and means:

(a) to add or subtract color from lithographic work, photoengraving gravure, negative or positive photographic material, etc.;

(b) to spread, shrink, distort, vary or produce three-dimensional effects on plates produced from photomechanical art, line work, typography, illustrations, half-toned screen pictures, screened tints, photographs of pictures, etc.;

(c) for creating novel half-tone screen effects.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Figure 1:
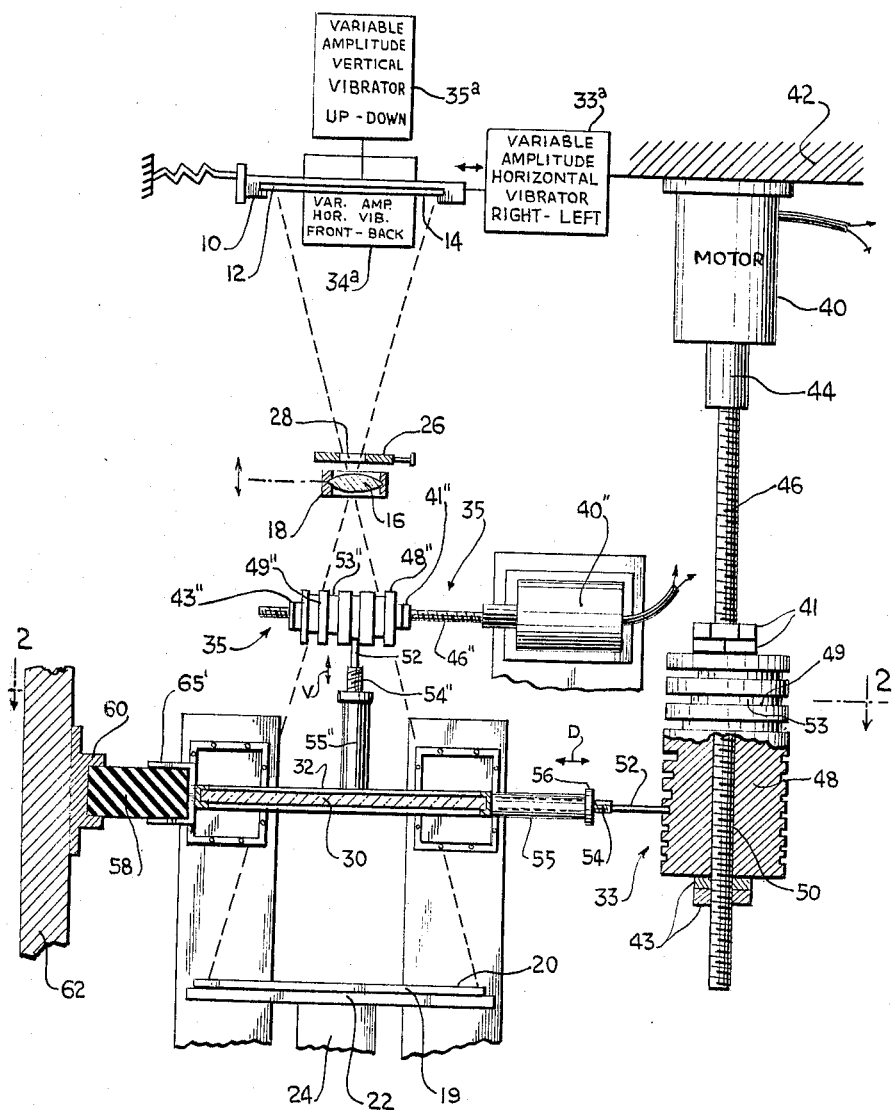
FIG. 1 is an elevational view partially in section and partially diagrammatic in form, illustrating a method and apparatus embodying the invention.

Referring first to the drawings, there is shown a horizontal holder 10 for a copy sheet 12 which may have any kind of graphic copy material 14 exposed to a camera lens 16. The lens is mounted in a holder 18 which can be moved in the line of sight between sheet 12 and a photographic plate or material 19 having a photosensitive surface 20. The photographic plate 19 is carried on a backboard 22 mounted on a support 24. Interposed between the lens 16 and the copy sheet 12 or the plate 19 is a shutter 26 having a variable opening 28. Interposed between the photographic plate or material 19 and the copy sheet 12 is a glass screen 30 having fine mesh rulings. The glass screen is mounted in a frame 32. To the extent described, the arrangement of the copy lens and screen is conventional.

Figure 2:
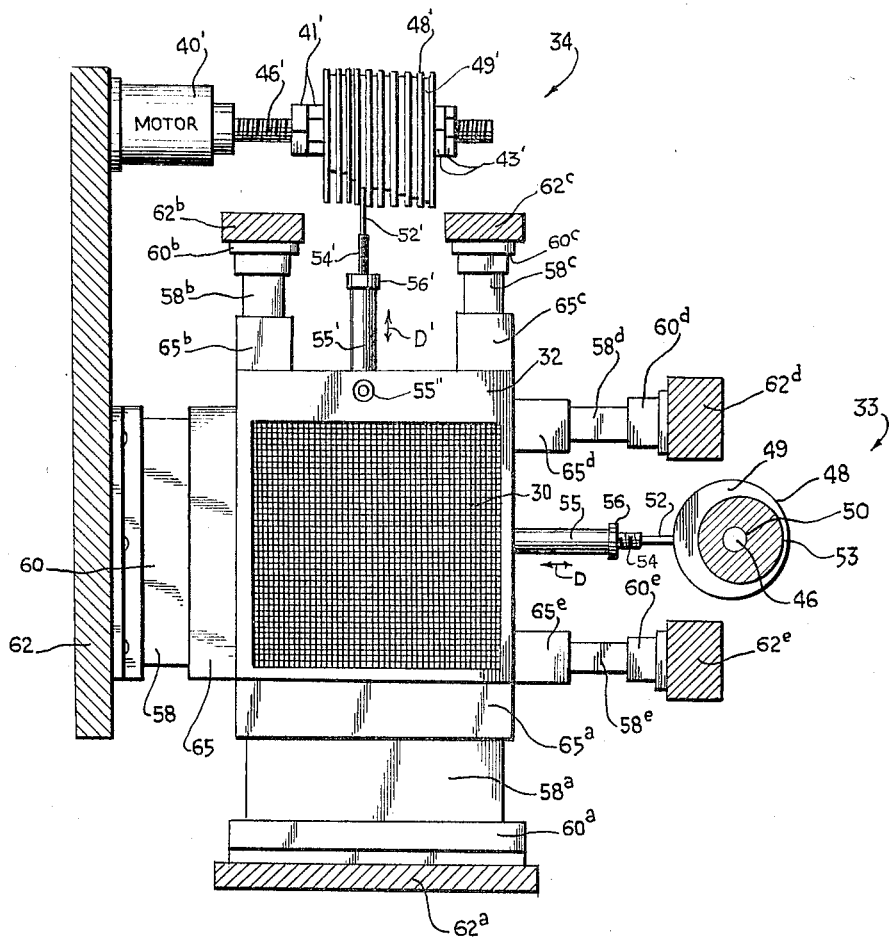
FIG. 2 is a horizontal sectional view taken on line 2—2 of FIG. 1.

According to the invention, three vibrator assemblies 33, 34 and 35 are provided for the screen 30 to vibrate the same in three mutually perpendicular planes. Three similar assemblies 33ª, 34ª and 35ª are provided for the copy holder 10 to vibrate the copy sheet in three mutually perpendicular planes. Assemblies 33, 33ª serve to vibrate the screen and copy holder respectively in a horizontal direction D extending left and right as viewed in FIGS. 1 and 2. Assemblies 34, 34ª vibrate the screen and copy holder respectively in horizontal direction D' extending front and back as viewed in FIGS. 1 and 2, perpendicular to the direction D. Assemblies 35, 35ª vibrate the screen 30 vertically in direction V as viewed in FIGS. 1 and 2.

Assembly 33 includes a motor 40 mounted axially vertical on a stationary support 42. The motor has a shaft 44 to which is secured a threaded shaft 46. On shaft 46 is a cylindrical cam roller 48. The roller is adjustably positioned axially of shaft 46 since the roller has a threaded bore 50. Locknuts 41, 43 at opposite ends of the roller lock it in any desired position on the shaft 46. The roller has endless grooves or slots 49 eccentric with respect to the axis of roller 48. The grooves are spaced along the roller and have progressively greater depths radially of the roller axis.

A cam follower rod or pin 52 carried by a threaded shaft 54 is adjustably positionable in any one of the grooves 49. The shaft 54 is adjustably screwed into a threaded sleeve 55 mounted at the right side of frame 32 as viewed in FIGS. 1 and 2. A locknut 56 fixes the position of shaft 54 in the sleeve.

Screen frame 32 is resiliently supported at its left end in a horizontal plane by a massive flexible rubber block 58 supported in a bracket 60 mounted on a stationary support 62. The right end of the block is engaged in a cup-shaped support 65 secured to the left end of the frame 32. The frame 32 is supported at its front end by another rubber block 58ª carried in a bracket 60ª on support 62ª. The rear end of the block 58ª is engaged in a cup-shaped support 65ª.

The rear end of the frame is supported by two horizontally spaced flexible rubber blocks 58ᵇ, 58ᶜ having front cup supports 65ᵇ, 65ᶜ secured to the rear end of frame 32. The rear ends of the blocks are engaged in brackets 60ᵇ, 60ᶜ carried on stationary supports 62ᵇ, 62ᶜ.

The right end of the frame 32 is supported by two horizontally spaced flexible rubber blocks 58ᵈ, 58ᵉ having left end cup supports 65ᵈ, 65ᵉ secured to the right end of frame 32. The right ends of the blocks are engaged in brackets 60ᵈ, 60ᵉ carried on stationary supports 62ᵈ, 62ᵉ.

It will be apparent that the frame 32 and screen 30 are thus supported in a horizontal plane but can be moved laterally slightly in the elastic blocks. As the cam roller 48 is rotated by motor 40 the screen 30 will be vibrated in a reciprocating manner from side to side, left and right while the pin 52 follows the varying radius of the selected groove 49. The blocks serve as spring elements to tend to return the screen and frame to a stable center position.

The pin 52 can be adjusted so that it makes continuous contact with the inner wall 53 of the selected groove 49 or so that it makes intermittent contact. If the pin makes continuous contact then the frame 32 will vibrate in a controlled one oscillation per revolution of the roller 48. If the pin is slightly retracted in the groove so that it contacts the wall 53 during only a part of each revolution of the roller 48, then the frame 32 will vibrate with a free but damped amplitude and period of vibration each time the pin 52 disengages from wall 53 as the resilient, elastic blocks tend to restore the frame 32 to stable postion.

The vibrator assembly 34 is similar to assembly 33 and operates in the same manner. Parts of assembly 34 corresponding to those of assembly 33 are indicated by primed numbers. Vibrator assembly 34 also vibrates the screen in a horizontal plane but in front and back direction D'. If desired for some applications, the two assemblies 33 and 34 can operate simultaneously to impart a twisting motion in a horizontal plane to the screen.

Vibrator assembly 35 is similar to assemblies 33 and 34 and corresponding parts are indicated by double primed numbers. Assembly 35 vibrates the screen and frame in an up and down direction. Assembly 35 can be operated alone or simultaneously with either one or both vibrator assemblies 33 and 34 to impart an oblique twisting vibration movement to the screen and frame.

The vibrator assemblies 33ᵃ, 34ᵃ and 35ᵃ are indicated only schematically since they are identical in structure to assemblies 33, 34 and 35, respectively. They serve to vibrate the copy holder in directions D, D' and V, respectively. Any one or more of assemblies 33ᵃ, 34ᵃ, 35ᵃ can be operated at any one time. The copy holder and screen 30 can be vibrated simultaneously in the same or in different horizontal and vertical directions, or either the copy holder or screen can be vibrated alone. The arrangement has thus complete versatility of vibration amplitudes and directions in any desired way.

In general the maximum vibration amplitudes will depend on the mesh of the screen 30. The following table may serve as a guide to vibration amplitudes:

*Vibration table*

| Screen lines per inch: | Maximum vibration amplitude-inches |
|---|---|
| 45 | 1/45 |
| 65 | 1/65 |
| 85 | 1/85 |
| 100 | 1/100 |
| 110 | 1/110 |
| 120 | 1/120 |
| 133 | 1/133 |
| 150 | 1/150 |
| 300 | 1/300 |

As may be noted from the table, in general, the maximum amplitude should not be more than the spacing between any two adjacent lines of the screen, and preferably is less. In certain cases where diffusion or softening effects are desired, the maximum amplitude may exceed the spacing between two adjacent lines, but it should not exceed double the spacing between any two adjacent lines.

The screen vibration will correct photographs by adding or subtracting color or diffusing color. The copy vibration will be found to correct photographs by spreading, shrinking, distorting, etc. Since vibration of the screen and copy produce somewhat different effects, vibrating the screen and copy simultaneously produces combined photographic effects not attainable in any other way heretofore.

In use of the apparatus the cameraman may vibrate the screen 30 at a certain amplitude during part of the exposure of the copy sheet 12 to plate 19. Then the cameraman can stop vibration during a subsequent part of the exposure. He can change the amplitude setting of any vibrator assembly and/or change the stop opening of the lens shutter 26 and continue the exposure while vibrating the screen 30 at another amplitude. This will enable him to vary highlights, middle tones, shadows and details at will.

When doing color separations or duotones, vibration of the screen will correct screened color separation direct from colored copy. This will be true whether the color copy is a transparency or an opaque colored picture being photographed by colored light reflected light. Vibration in such work will enhance detail or will drop out undesired color without affecting details.

The apparatus and method described will produce novel half-tone effects not heretofore been possible. The apparatus and method in many cases will be found to reduce exposure time. Use of expensive magenta and silver or grey screens may be dispensed with and conventional glass screens can be used in place. Other advantages of the invention arising from use of the method and apparatus described will readily occur to those skilled in the art. Other vibrating assemblies and equipment may be used in place of the particular apparatus described.

While I have illustrated and described the preferred embodiment of my invention, it is to be understood that I do not limit myself to the precise construction herein disclosed and that various changes and modifications may be made within the scope of the invention as defined in the appended claims.

Having thus described my invention, what I claim as new, and desire to secure by United States Letters Patent is:

1. Apparatus for modifying an image recorded on a photosensitive plate, comprising means for supporting said plate in a first plane, a holder for a graphic copy sheet vibratably supported in a second plane parallel to said first plane, a fine mesh screen vibratably supported in a third plane between said copy sheet holder and plate support, and means for selectively vibrating said screen and said copy sheet in their planes and in planes perpendicular thereto.

2. Apparatus for modifying an image recorded on a photosensitive plate, comprising means for supporting said plate in a first plane, a holder for a graphic copy sheet vibratably supported in a second plane parallel to said first plane, a fine mesh screen vibratably supported in a third plane between said copy sheet holder and plate support, means for selectively vibrating said screen and said copy sheet in their planes and in planes perpendicular thereto at a selected amplitude, and means for varying at will the amplitude of vibration of said screen and copy sheet.

3. Apparatus for modifying an image recorded on a photosensitive plate, comprising means for supporting said plate in a first plane, a holder for a graphic copy sheet vibratably supported in a second plane parallel to said first plane, a fine mesh screen vibratably supported in a third plane between said copy sheet holder and plate support, a plurality of vibrator assemblies including eccentric cam means operatively engaging said screen and copy sheet holder for selectively vibrating said screen and copy sheet in their planes and perpendicular thereto, at selected amplitudes.

4. Apparatus for modifying an image recorded on a photosensitive plate, comprising means for supporting said plate in a first plane, a holder for a graphic copy sheet vibratably supported in a second plane parallel to said first plane, a fine mesh screen vibratably supported in a third plane between said copy sheet holder and plate support, a plurality of vibrator assemblies including eccentric cam means operatively engaging said screen and copy sheet holder for selectively vibrating said screen and copy sheet in their planes and perpendicular thereto, at selected amplitudes, said cam means including adjustment means whereby the amplitudes of vibration of the screen and copy sheet are changed at will.

References Cited by the Examiner

UNITED STATES PATENTS

| 1,577,442 | 3/1926 | Bassani | 96—38 X |
| 1,680,585 | 8/1928 | Berg | 96—116 |

NORTON ANSHER, *Primary Examiner.*

R. A. WINTERCORN, *Assistant Examiner.*